United States Patent [19]

Crispoldi

[11] Patent Number: 5,716,591

[45] Date of Patent: Feb. 10, 1998

[54] PROCESS FOR PRODUCING CALCIUM NITRATE-UREA ADDUCT

[75] Inventor: Antonio Crispoldi, Terni, Italy

[73] Assignee: Nuova Terni Industrie Chimiche S.p.A., Milan, Italy

[21] Appl. No.: 351,541

[22] Filed: Dec. 7, 1994

Related U.S. Application Data

[63] Continuation of Ser. No. 009,123, Jan. 26, 1993, abandoned.

[30] Foreign Application Priority Data

Jan. 27, 1992 [IT] Italy ................. M92A00134

[51] Int. Cl.$^6$ ................................................. C01B 21/48
[52] U.S. Cl. ................ 423/397; 504/158; 504/163; 504/327; 564/32; 564/63
[58] Field of Search ............... 564/63, 32; 423/397; 504/327, 158, 163

[56] References Cited

U.S. PATENT DOCUMENTS

| | | | |
|---|---|---|---|
| 3,475,132 | 10/1969 | Seifert et al. | 34/10 |
| 4,091,544 | 5/1978 | Hutchins | 34/9 |
| 4,497,757 | 2/1985 | Beimesch et al. | 264/13 |
| 4,749,349 | 6/1988 | Thuring et al. | 425/222 |
| 4,874,595 | 10/1989 | Crispoldi et al. | 423/397 |

FOREIGN PATENT DOCUMENTS

| | | |
|---|---|---|
| 0663273 | 11/1987 | Czechoslovakia. |
| 0278562 | 8/1988 | European Pat. Off.. |

OTHER PUBLICATIONS

Derewent Abstract No. 663273, Nov. 1987.

*Primary Examiner*—Shailendra Kumar
*Attorney, Agent, or Firm*—Rogers & Wells; George P. Hoare

[57] ABSTRACT

Calcium nitrate-urea adduct, a product having the formula $[Ca(NO_3)_2 \cdot 4CO(NH_2)_2]$, is obtained by means of a process which basically consists of the following steps:
- mixing molten urea and calcium nitrate;
- feeding the resulting solution to a turbodryer;
- feeding the resulting molten salt to a granulator drum;
- recovery of calcium nitrate-urea adduct.

1 Claim, 1 Drawing Sheet

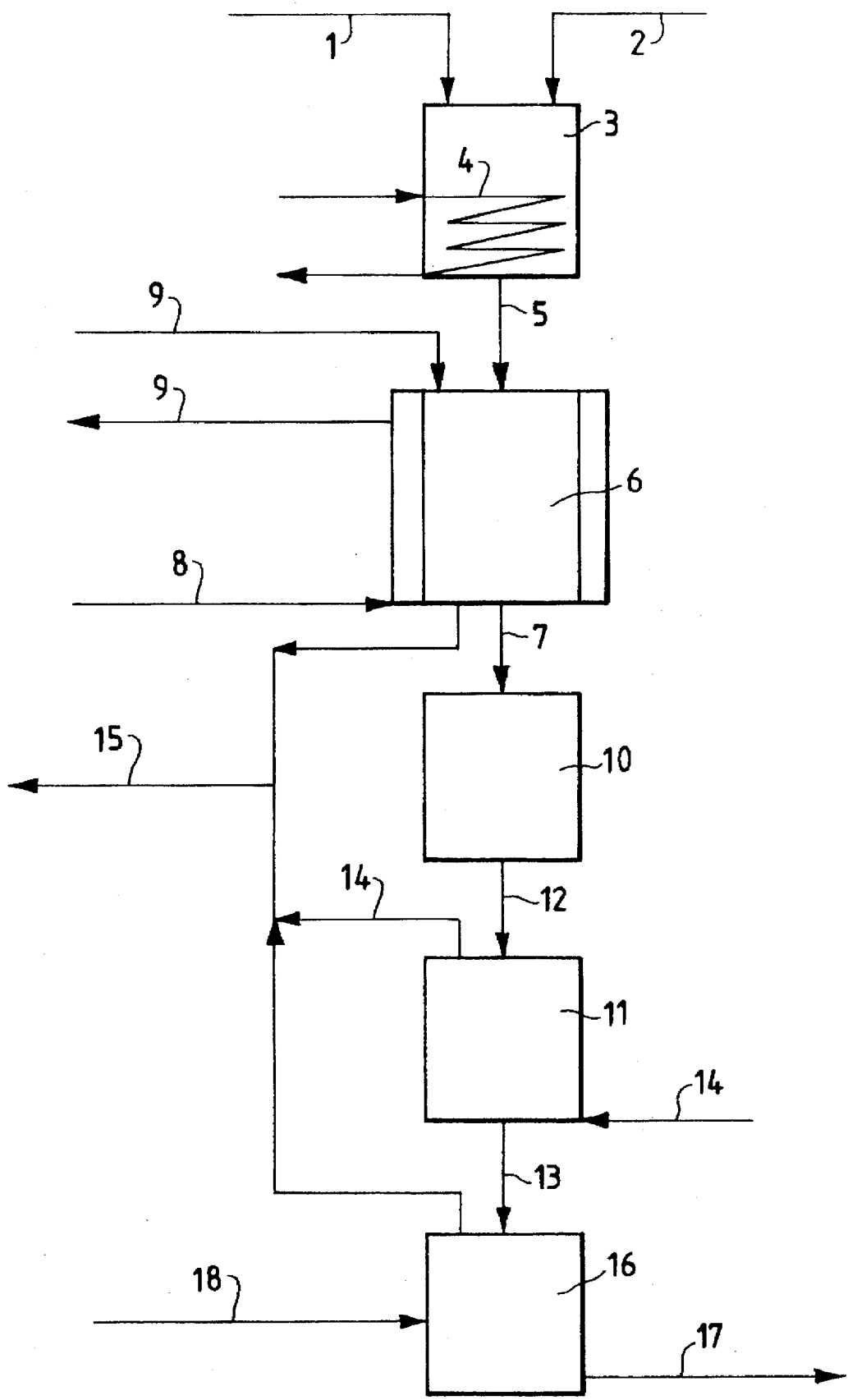

PROCESS FOR PRODUCING CALCIUM NITRATE-UREA ADDUCT

This application is a continuation of U.S. Ser. No. 08/009,123, filed Jan. 26, 1993, now abandoned.

FIELD OF THE INVENTION

The present invention relates to an improved process for producing calcium nitrate-urea adduct as a granular, free-flowing solid material which has been used in the past, as such, in agriculture, as a nitrogenous fertilizer. In a narrower sense, the invention also relates to some equipment pieces useable in order to carry out such a process.

BACKGROUND OF THE INVENTION

Calcium nitrate-urea adduct is a per se known compound and is an addition product of calcium nitrate and urea, in which calcium nitrate constitutes 40.6% by weight, and can be defined by means of the formula $[Ca(NO_3)_2 \cdot 4CO(NH_2)_2]$.

Calcium nitrate-urea adduct potentially is a very interesting compound as a fertilizer, because, additionally to ureic nitrogen, it contains nitric nitrogen, the presence of which makes it possible the typical ammonia losses shown by urea alone, when the latter undergoes the hydrolysis process in the soil, to be avoided.

In spite of the above, calcium nitrate-urea adduct did not find heretofore a meaningful commercial success, above all owing to the difficulties met when one wishes to obtain that product with suitable physical characteristics for its use as an agricultural fertilizer.

For example, processing calcium nitrate-urea adduct through crystallization, prilling and rotary-tray granulation does not make it possible a granular, free-flowing product with no tendency to release dusts, to be obtained.

In the art also a fluidized bed processing was proposed, a technique which meets with operating difficulties and requires the use of complex equipment pieces.

Furthermore, the product which can be obtained in that way contains an excess of urea over to the required urea amount in order to form the adduct, and also characterized by the undesirable characteristic of low values of granules hardness, From Italian patent application No. 19 363A/87 filed on Feb. 13$^{th}$, 1987, a process is known which makes it possible the above reminded drawbacks to be partially overcome, according to which process:

a liquid composition is prepared, at a temperature of not more than 170° C., which contains urea and calcium nitrate;

said liquid composition is sprayed onto previously formed, solid particles of calcium nitrate-urea adduct, kept in movement;

calcium nitrate-urea adduct is recovered from said solid spraying products,

The resulting calcium nitrate-urea adduct is in the form of a granular solid material and can be used in agriculture as a nitrogen containing fertilizer, Unfortunately, directly feeding the liquid composition obtained from the first step, under the action of a hot gas, onto previously formed solid particles of calcium nitrate-urea adduct, for example kept moving inside a rotary drum, does not eliminate all of the drawbacks briefly mentioned hereinabove; in particular, not always granules can be obtained which are all free-flowing, or endowed with perfectly homogeneous mechanical characteristics.

SUMMARY OF THE INVENTION

Therefore, the subject-matter of the present invention is an improved process for producing calcium nitrate-urea adduct, which makes it possible a perfectly granular and free-flowing product to be obtained which is absolutely homogeneous as regards the mechanical characteristics of the various particles, which process substantially comprises the following steps:

(a) mixing molten urea and calcium nitrate;

(b) feeding the resulting solution to a turbodryer;

(c) feeding the resulting molten salt to a granulation zone;

(d) recovery of calcium nitrate-urea adduct.

In particular, in the (a) step a liquid composition is prepared at a temperature not higher than 170° C., which contains urea and calcium nitrate in a mutual molar ratio equal, or approximately equal, to 4:1, and containing a water content of up to 18% by weight.

In order to prepare such a liquid composition, calcium nitrate can be used as a dried powder, or as a concentrated aqueous suspension containing a water content of up to values of the order of 15–18% by weight.

Furthermore, the calcium nitrate used may contain ammonium nitrate as an impurity, up to levels of the order of 5–6% by weight.

Urea used in the preparation of such a composition normally shows a purity of the order of 97% by weight or more, and may contain biuret as an impurity, in an amount of up to approximately 1.2% by weight.

The preparation of such a liquid composition can be carried out according the normal techniques well known to those skilled in the art, or according to as disclosed in the disclosure of the Italian patent application No. 19 363A/87 mentioned above, to which reference is made of course for any further details.

The solution obtained in that way contains water which, if sent to the granulation step, could cause those unevenness drawbacks already mentioned above.

According to the process of the present invention, the solution obtained from the preliminary mixing step [(a) step] is sent, at a temperature comprised within the range of from 120° to 170° C., to a particular turbodryer [(b) step], with, in that way, anhydrous, molten calcium nitrate-urea adduct at the temperature of 150°–200° C. being directly obtained at the outlet.

According to a preferred embodiment of the present invention, the turbodryer is basically constituted by a cylindrical shell heated from the outside with closed-loop circulated diathermic oil.

Said oil is kept at its operating temperature by heating by means of a heating unit.

Inside said cylindrical shell and coaxial with it, shaft is provided which is equipped with a plurality of paddles and is kept revolving at a revolution speed preferably of round 400 g/minute. Said paddles perform the task of distributing the entering solution along the walls of the cylindrical chamber, so as to realize a thin-film concentration.

Said equipment may operate either in the presence or in the absence of a flowing stream of hot air.

The resulting molten salt is sent, through a suitable pump, to a fluidized-bed granulator drum.

Still according to a a preferred embodiment, the granulator can be constituted by a cylindrical drum revolving around its own axis at a revolution speed which is comprised within the range of from 8 to 12 revolution per minute, which cylindrical drum is equipped with longitudinal baffles integral with the internal surface of the same cylindrical drum.

Along the axis of the drum, the fluidized bed is positioned, and under it there is the beam which supports the spraying nozzles. The baffles perform the task of moving the calcium nitrate-urea adduct granules towards the high side of the drum, so that they may then be caused to fall back into the cooling fluidized bed; during the subsequent falling of the salt from the fluidized bed towards the bottom of the drum, a curtain is formed onto which calcium nitrate-urea adduct sprayed by the nozzles impinges.

The fluidized bed is fed, from its interior, with room air heated at a temperature comprised within the range of from 60° to 120° C.: it performs the purpose of removing the melting heat of the granules which are being formed.

The temperature at the outlet from the granulator is comprised within the range of from 80° to 115° C.

The product is then sent to the sieving and recycle system. Also a step of post-drying of the so separated granules can be added, in order to reach optimal hardness values. Also the use of a hardening agent can be provided for.

For these operations too, as well as for alternative solutions to the rotary drum as disclosed above, those skilled in the art may select any from the large number of operating ways which are suggested from the prior art or, also, stick to indications supplied by the above mentioned Italian patent application No. 363A/87, the disclosure of which, for the pertinent portions, is incorporated herein by reference.

BRIEF DESCRIPTION OF THE DRAWINGS

The accompanying FIGURE illustrates a flow chart of a preferred embodiment of the invention.

DETAILED DESCRIPTION OF A PREFERRED EMBODIMENT OF THE INVENTION

The following illustrative, non-limitative, example, contributes to a better understanding of the present invention, of which it supplies further details.

EXAMPLE

Referring to the flow chart shown in the FIGURE, in order to obtain 1000 kg of calcium nitrate-urea adduct:

(A) From line (1) to the vessel (3) molten calcium nitrate with the following characteristics:
Temperature=135° C.
kg=500
Composition: $Ca(NO_3)_2$=79% by weight
$NH_4NO_3$=6% by weight
$H_2O$=15% by weight is fed to the vessel (3).
From line (2), molten urea having the characteristics:
Temperature=136° C.
kg=574.7
Composition: $CO(NH_2)_2$=98.8% by weight
biuret=0.8% by weight
$H_2O$=0.4% by weight enters said reaction vessel (3).

(B) Inside the reaction vessel (3) the reaction takes place with heat being developed which is removed from the system by means of a water cooled coil (4).

At the outlet (5) from the reaction vessel, a solution of calcium nitrate-urea adduct is obtained with the following characteristics:
Temperature=115°–125° C.
kg=about 1075
Composition: $CO(NH_2)_2$=52.8% by weight
$Ca(NO_3)_2$=36.7% by weight
$NH_4NO_3$=2.8% by weight
biuret=0.4% by weight
$H_2O$=7.2% by weight (C) The resulting calcium nitrate-urea adduct solution is fed to a thin-film turbodryer (6) where the evaporation of water takes place and at the outlet (7) molten calcium nitrate-urea adduct is obtained a temperature of approximately 180° C., which by analysis is shown to have the following composition:
$CO(NH_2)_2$=56.3% by weight
$Ca(NO_3)_2$=39.4% by weight
$NH_4NO_3$=3.0% by weight
biuret=0.8% by weight
$H_2O$=0.5% by weight The jacket of the turbodryer is kept hot by circulating (8) diathermic oil at the temperature of about 250° C., and inside the interior of the turbodryer a stream of hot air (9) is flown, which facilitates stripping steam from the mass which is being concentrated.

(D) The molten product, which is at the temperature of 180° C., is sent (12) to the granulator (11) by means of the release pump (10), then is cooled (14) with room air, so that the leaving granulate (13) is at a temperature comprised within the range of from 80° to 115° C. Air is then sent to the scrubber (15).

(E) The granulate is sieved, then is cooled in the fluidized bed (16), and is subsequently sent to the packaging step (17).

The fluidized bed feeding air (18) is cold and dried: temperature 10° C., and saturated at 4° C. Characteristics of the end product:
Amount=1000 kg
$CO(NH_2)_2$=56.2% by weight
$Ca(NO_3)_2$=39.4% by weight
$NH_4NO_3$=3.3% by weight
Biuret=0.9% by weight
$H_2O$=0.2% by weight
Total N=34.5% by weight
Nitric N=7% by weight
Granulometry=95% comprised within the range of from 2 to 4 mm
Hardness of granules=4000 g

I claim:

1. A process for producing solid, granular, free-flowing calcium nitrate-urea, which process comprises the following steps:

(a) preparing, at a temperature not higher than 170° C., a solution comprising urea and calcium nitrate and having a water content of up to 18% by weight, wherein the molar ratio of urea to calcium nitrate is about 4/1;

(b) feeding the solution prepared in step (a) to a turbodryer via an inlet having a temperature of from 120° C. to 170° C. so as to produce an essentially anhydrous molten salt from the solution, said turbodryer consisting essentially of (i) a cylindrical shell heated from the outside with diathermic oil circulated in a closed loop, and (ii) a rotatably affixed shaft with paddles rotating at a speed of about 400 revolutions per minute;

(c) feeding the molten salt produced in step (b) to a granulation zone so as to produce solid, granular, free-flowing calcium nitrate-urea, said zone comprising a rotary cylindrical drum (i) revolving around its axis, (ii) having longitudinal baffles integral with the inner surface thereof, (iii) a fluidized bed situated along its axis, which bed is fed, from its interior, with room air having a temperature of from 60° C. to 120° C., and (iv) a beam bearing spraying nozzles situated under the fluidized bed; and (d) recovering solid, granular, free-flowing calcium nitrate-urea produced in step (c).

* * * * *